US011970889B2

(12) United States Patent
McIntire et al.

(10) Patent No.: US 11,970,889 B2
(45) Date of Patent: Apr. 30, 2024

(54) OUTWARD SWINGING DOOR BARRICADE

(71) Applicant: Government of the United States as represented by the Secretary of the Air Force, Wright-Patterson AFB, OH (US)

(72) Inventors: John P. McIntire, Dayton, OH (US); Matthew Srnoyachki, Beavercreek, OH (US)

(73) Assignee: United States of America as represented by the Secretary of the Air Force, Wright-Patterson AFB, OH (US)

( * ) Notice: Subject to any disclaimer, the term of this patent is extended or adjusted under 35 U.S.C. 154(b) by 0 days.

(21) Appl. No.: 18/351,214

(22) Filed: Jul. 12, 2023

(65) Prior Publication Data

US 2023/0349212 A1 Nov. 2, 2023

Related U.S. Application Data

(60) Continuation of application No. 16/001,372, filed on Jun. 6, 2018, now Pat. No. 11,834,875, which is a (Continued)

(51) Int. Cl.
*E05C 19/18* (2006.01)
*E05B 17/20* (2006.01)
(Continued)

(52) U.S. Cl.
CPC ........ *E05C 19/182* (2013.01); *E05B 17/2084* (2013.01); *E05C 17/08* (2013.01);
(Continued)

(58) Field of Classification Search
CPC .......... E05C 17/08; E05C 17/54; E05C 17/02; E05C 17/04; E05C 17/047; E05C 17/44;
(Continued)

(56) References Cited

U.S. PATENT DOCUMENTS 359,815 A * 3/1887 Sargent ................. E05C 19/182 269/208
605,809 A * 6/1898 Plimpton .............. E05C 19/182 292/293
(Continued)

*Primary Examiner* — Alyson M Merlino
(74) *Attorney, Agent, or Firm* — AFMCLO/JAZ; Chastity D.S. Whitaker

(57) ABSTRACT

The emergency egress apparatus includes a protuberance mated to a first portion of the door barricade and a keeper mated to a second portion of the door barricade. A retainer is selectively disposed between one of two positions. A first position defines the placement of the retainer that establishes an interference fit between the protuberance and the keeper. A second position defines the placement of the retainer such that it is not in contact with the protuberance or the keeper. The first position secures the first portion of the door barricaded with respect to the second portion of the door barricade, and the second position decouples the first portion of the door barricade with respect to the second portion of the door barricade.

4 Claims, 5 Drawing Sheets

Related U.S. Application Data division of application No. 15/097,389, filed on Apr. 13, 2016, now abandoned.

(60) Provisional application No. 62/181,432, filed on Jun. 18, 2015.

(51) Int. Cl.
*E05C 17/08* (2006.01)
*E05C 17/54* (2006.01)

(52) U.S. Cl.
CPC ............ *E05C 17/54* (2013.01); *E05C 19/184* (2013.01); *E05C 19/188* (2013.01)

(58) Field of Classification Search
CPC .......... E05C 17/46; E05C 17/48; E05C 17/50; E05C 17/505; E05C 17/14; E05C 17/18; E05C 17/30; E05C 17/62; E05C 17/166; E05C 19/18; E05C 19/182; E05C 19/184; E05C 19/188; Y10T 292/34; Y10T 292/37; Y10T 292/373; Y10T 292/376; Y10T 292/379; Y10T 292/382; Y10T 292/385; Y10T 292/388; Y10T 292/391; Y10T 292/394; Y10T 292/397; Y10T 292/65; Y10T 292/67; Y10T 292/432; Y10S 292/15; Y10S 292/19; Y10S 292/65; Y10S 292/60
See application file for complete search history.

(56) References Cited

U.S. PATENT DOCUMENTS 672,473 A * 4/1901 Brooks ................. E05C 19/182 292/298
827,624 A * 7/1906 Foster ..................... E05C 19/18 292/288
1,057,277 A * 3/1913 Rogers .................. E05C 19/182 49/394
1,073,238 A * 9/1913 Houston ............... E05C 19/182 292/293
1,477,731 A * 12/1923 Ulrich .................. E05C 19/182 292/293
1,888,425 A * 11/1932 Dowling ............... E05C 19/182 292/291
2,288,022 A * 6/1942 O'Brien ................ E05C 19/182 248/68.1
2,562,301 A * 7/1951 Dorion .................... E05C 19/18 292/293
3,423,968 A * 1/1969 Foote .................... E05C 19/182 70/95
3,429,151 A * 2/1969 Weingart .............. E05C 19/182 70/230
3,589,761 A * 6/1971 Lambert ............... E05C 19/182 292/292
3,671,067 A * 6/1972 Wegner ................. E05C 19/182 292/292
3,854,764 A * 12/1974 Corrigan ............... E05C 19/182 292/289
3,913,962 A * 10/1975 Briggs .................. E05C 19/182 292/292
4,022,503 A * 5/1977 Bey ....................... E05C 19/182 292/264
4,082,335 A * 4/1978 Smith ................... E05C 19/182 292/291
4,155,578 A * 5/1979 Rolland ................ E05C 19/182 292/292
4,169,619 A * 10/1979 McCracken .......... E05C 19/182 292/296
4,198,088 A * 4/1980 Tochihara ............... E05C 19/18 292/288
4,200,317 A * 4/1980 Polselli ................. E05C 19/182 292/293
4,285,535 A * 8/1981 Leary .................... E05C 19/182 292/293
4,290,635 A * 9/1981 McKenzie ............ E05C 19/182 292/290
4,330,146 A * 5/1982 Sessions, Jr. ......... E05C 19/182 292/288
4,334,705 A * 6/1982 Rumph ................... E05C 19/18 292/288
4,386,797 A * 6/1983 Duran, Sr. ............ E05C 19/182 292/292
4,387,919 A * 6/1983 Quaintance ........... E05C 19/182 292/296
4,406,488 A * 9/1983 Polselli ................. E05C 19/182 292/293
4,429,913 A * 2/1984 Bey ....................... E05C 19/182 292/293
4,575,140 A * 3/1986 Dargis .................. E05C 19/184 292/296
4,653,786 A * 3/1987 Bopst, III ............. E05C 19/182 292/295
4,878,701 A * 11/1989 Rondel ................. E05C 19/182 292/288
4,958,868 A * 9/1990 Watrous, Jr. .......... E05C 19/184 292/258
5,098,142 A * 3/1992 Fontenot ............... E05C 19/184 292/288
5,135,272 A * 8/1992 Centofante ........... E05C 19/182 292/293
5,193,867 A * 3/1993 Husted .................. E05C 19/182 292/288
5,203,187 A * 4/1993 Kane ..................... E05B 13/001 70/424
5,221,116 A * 6/1993 Lan ....................... E05C 19/182 292/291
5,265,922 A * 11/1993 Falcone ................ E05C 19/184 292/288
5,325,685 A * 7/1994 Frank .................... E05C 19/182 292/296
5,360,245 A * 11/1994 David ................... E05C 19/182 292/297
5,462,321 A * 10/1995 Osborn .................... E05C 19/18 292/288
5,531,491 A * 7/1996 Skelton ................. E05C 19/182 292/293
5,566,993 A * 10/1996 Olivas ................... E05C 19/182 292/288
D376,747 S * 12/1996 Jackson ......................... D8/333
5,664,814 A * 9/1997 Lin ....................... E05C 19/182 292/296
5,667,262 A * 9/1997 Planchon .............. E05C 19/182 292/288
5,685,580 A * 11/1997 West ..................... E05C 19/182 292/288
5,794,871 A * 8/1998 Willetts .................. E05C 19/18 292/288
5,810,404 A * 9/1998 Horne ................... E05C 19/182 292/288
5,924,751 A * 7/1999 Moore .................. E05C 17/047 292/288
5,984,387 A * 11/1999 Zeller ................... E05C 19/182 292/296
6,409,236 B1 * 6/2002 Steele ................... E05C 19/182 292/291
6,416,089 B1 * 7/2002 Williams, Jr. ........ E05C 19/182 292/288
6,658,906 B1 * 12/2003 Wright .................. E05C 19/182 70/424
6,926,316 B2 * 8/2005 Patire .................... E05C 19/182 292/290
6,976,716 B2 * 12/2005 Lin ....................... E05C 19/182 292/296
7,216,902 B2 * 5/2007 Marra ................... E05C 19/182 292/288

(56) References Cited

U.S. PATENT DOCUMENTS

| | | | | |
|---|---|---|---|---|
| 7,360,809 | B1 * | 4/2008 | Poston | E05B 15/0205 292/346 |
| 7,419,197 | B1 * | 9/2008 | Leith | E05C 19/182 292/288 |
| 8,469,410 | B2 * | 6/2013 | Wood | E05C 19/184 292/288 |
| 8,510,994 | B2 * | 8/2013 | Scott | E05C 3/048 292/297 |
| 2002/0067046 | A1 * | 6/2002 | Cox, Sr. | E05C 19/184 292/289 |
| 2009/0102205 | A1 * | 4/2009 | Carr | E05C 19/003 292/259 R |
| 2010/0026017 | A1 * | 2/2010 | Ramos, III | E05C 19/182 292/295 |

* cited by examiner

OUTWARD SWINGING DOOR BARRICADE

This application is a continuation of U.S. application Ser. No. 16/001,372, filed 6 Jun. 2018, which claims the benefit of and priority to prior filed non-provisional application Ser. No. 15/097,389 filed 13 Apr. 2016, which claims the benefit of and priority to prior filed and Provisional Application Ser. No. 62/181,432, filed 18 Jun. 2015, all of which are expressly incorporated herein by reference.

RIGHTS OF THE GOVERNMENT

The invention described herein may be manufactured and used by or for the Government of the United States for all governmental purposes without the payment of any royalty.

FIELD OF THE INVENTION

The present invention relates generally to fenestration security products and, more particularly, to rapidly deployable door barricade devices.

BACKGROUND OF THE INVENTION

Many facilities are configured with interior rooms, closets, passageways, and the like, that were not designed to serve as an impediment to reasonably dedicated forced entry. While there are instances where it is desirable to expediently secure areas not usually intended for shelter, hardware and infrastructure configurations may render attempts difficult or impossible.

At one extreme, passage function locksets are installed in certain areas of such facilities. A passage locket may be defined as a cylindrical or mortise locksets wherein neither the interior, nor exterior, knob (or lever) is capable of being locked against rotation (nor otherwise mechanically disengaged from the latch (as is possible with lost-motion, or free-wheeling, type of vandal resistant door hardware). Passage lockets, while readily available in robust and heavy-duty Grade 1 cylindrical or mortise configurations, are often installed in locations that building designers deem security or privacy to be superfluous. Passage locksets are generally less expensive, but avoidance of nuisance locking events may also influence one's decision to use passages sets. Passage sets may be found on closet doors, doors leading from upper floors to stairwells, doors located in a cluster beyond a common locked entryway, and the like.

In areas where the prevention of unintentional entry by a well-meaning individual is important, a privacy function lockset may be used. A privacy function lockset may be defined as a lockset wherein the exterior knob or lever may be locked against rotation by way of a thumb turn, push-button, or similar non-keyed action by a user standing on the interior side. In most instances the exterior privacy knob or lever does not employed a keyed cylinder a means for unlocking the lockset (say, in the event that a patient become incapacitated while in a bathroom). Rather, manufacturer provided tool (e.g., a polygonal rod, an implement analogous to a small blade screwdriver, etc.), or a feature capable of being interfaced with a household item (e.g. a slot that may be twisted with a coin), may be used to unlock the door. As such, only someone who desired to honor the wishes of the occupant's privacy is prevented from opening the door. "Defeat" of the privacy function lock is trivial for an individual who wished to enter the locked door.

Facilities may also employee keyed lockets in a multitude of configurations. However, even though keyed, the function or construction of the lockset may not contemplate delaying a determined forced entry attempt. For example, the lockset on a CEO's door may be keyed differently from other employee's doors, but may be no more resistant to forced entry (by kicking, wedging, prying, etc.) than the privacy function locksets used in the same facility. Additionally, most locksets are not designed with a feature that will repel a nefarious possessor of the correct key. For example, the CEO may leave his keys on a secretary's desk, while simultaneously desiring to lock himself in his office during a workplace violence event. Similarly, in some buildings, electronic key card access causes many doors to be "locked" to general access, but may be unlocked with an electronic key card possessed by employees or staff.

As a result of these limitations, a number of ingress denial, or ingress delay, apparatus and methods have been devised to combat the perceived threat of active shooters, workplace violence, or other forced entry to an occupied room. Barricading during these events with furniture, desks, bookshelves, etc. is recommended (for example, by the U.S. Department of Homeland Security) but takes time, effort, and may not be possible or effective. For example, an individual of slight build, or a child, may be unable to position massive furniture components for use as a barricade. Additionally, an outswinging door is less conductive to barricading with furniture, since the door swings free of the impeding furniture mass.

Likewise, replacement locksets having dedicated lockout features exist, but upgrading facility locks is often cost prohibitive. For example, to replace a single classroom function lockset with an "intruder function" locket may cost $500 to $700 in the case of a grade 1 mortise lockset.

Similarly, auxiliary devices exist that are configured to bolster the security of existing door and lockset combinations, however, most are not designed for rapid deployment under the stress of a life threatening encounter. For example, devices marketed to augment hotel locks and disable entry by a maid or emergency key, require a multi-step locking process), and may be multi-part assemblies. Additionally, many have infirmities from a user interface perspective (they are cumbersome to use and the user's fingers/hands/arms can get in the way of the door shutting). Further still, many products are not strong enough to stop a serious effort by a strong intruder to breach the door. Lastly, of the commercially available products that address some of those issues, their robustness may impair removal and egress in the event of an emergency or intervening circumstances.

As a result, there exists a need in the art for a portable, rapidly deployable, emergency door barricade that is sufficiently resistant to forced entry and is designed to facilitate efficient removal thereof.

SUMMARY OF THE INVENTION

The present invention overcomes the foregoing problems and other shortcomings, drawbacks, and challenges of barricading doors in emergency situations. While the invention will be described in connection with certain embodiments, it will be understood that the invention is not limited to these embodiments. To the contrary, this invention includes all alternatives, modifications, and equivalents as may be included within the spirit and scope of the present invention.

According to an embodiment of the disclosed invasion, an emergency egress apparatus for use with a door barricade is provided. The apparatus includes a protuberance mated to a first portion of the door barricade and a keeper mated to a second portion of the door barricade. A retainer is selectively disposed between one of two positions. A first position defines the placement of the retainer that establishes an interference fit between the protuberance and the keeper. A second position defines the placement of the retainer such that it is not in contact with the protuberance or the keeper. The first position secures the first portion of the door barricaded with respect to the second portion of the door barricade, and the second position decouples the first portion of the door barricade with respect to the second portion of the door barricade.

Additional objects, advantages, and novel features of the invention will be set forth in part in the description which follows, and in part will become apparent to those skilled in the art upon examination of the following or may be learned by practice of the invention. The objects and advantages of the invention may be realized and attained by means of the instrumentalities and combinations particularly pointed out in the appended claims.

BRIEF DESCRIPTION OF THE DRAWINGS

The accompanying drawings, which are incorporated in and constitute a part of this specification, illustrate embodiments of the present invention and, together with a general description of the invention given above, and the detailed description of the embodiments given below, serve to explain the principles of the present invention.

It should be understood that the appended drawings are not necessarily to scale, presenting a somewhat simplified representation of various features illustrative of the basic principles of the invention. The specific design features of the sequence of operations as disclosed herein, including, for example, specific dimensions, orientations, locations, and shapes of various illustrated components, will be determined in part by the particular intended application and use environment. Certain features of the illustrated embodiments have been enlarged or distorted relative to others to facilitate visualization and clear understanding. In particular, thin features may be thickened, for example, for clarity or illustration.

DETAILED DESCRIPTION OF THE INVENTION

Figure 1:
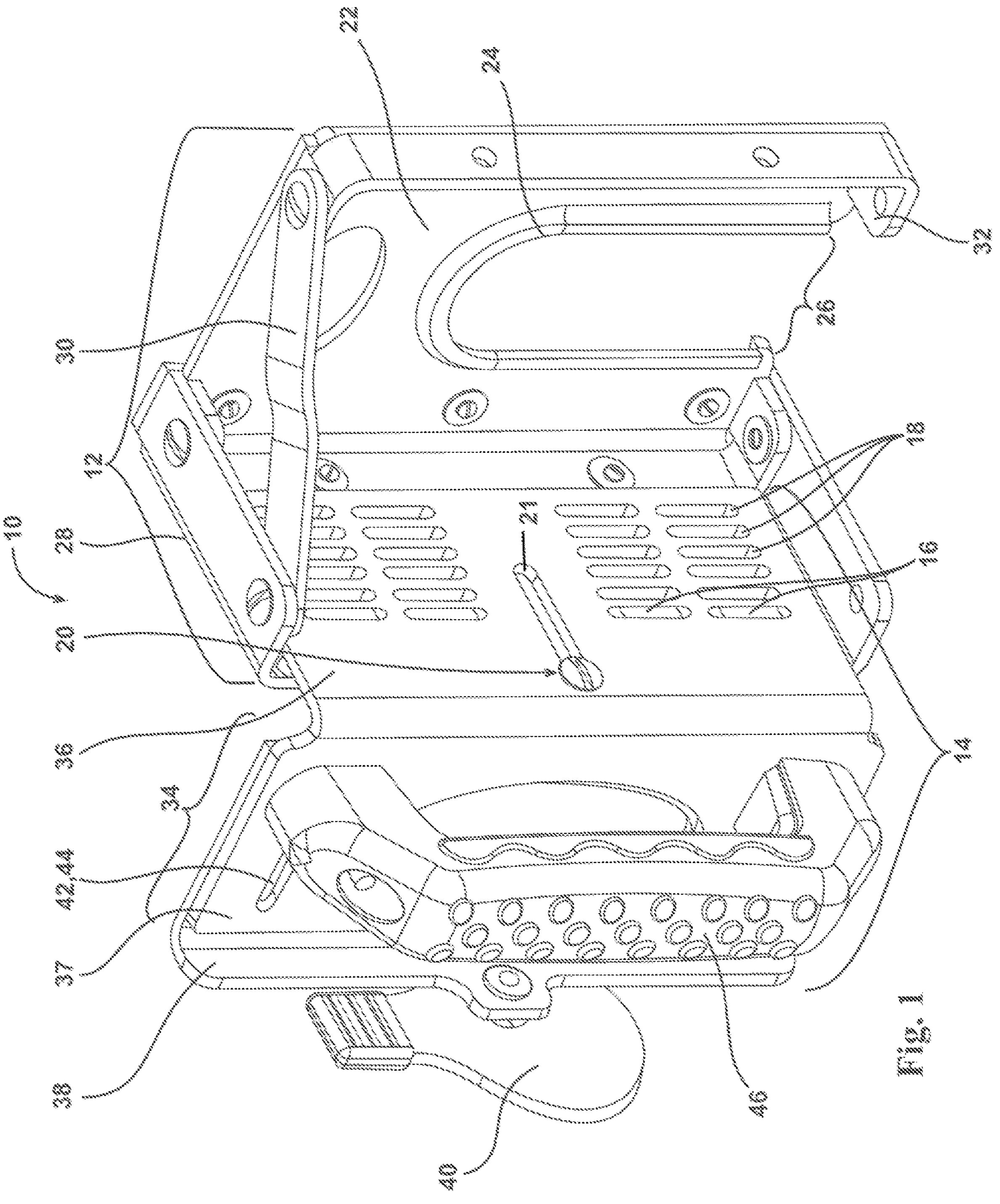
FIG. 1 is a perspective view of a first side of an embodiment of the disclosed invention.

Turning attention to FIG. 1, the door barricade apparatus 10 includes a portion configured to interact with a lockset knob on a door (a knob portion 12), and a portion configured to interact with a jamb of a door (a jamb portion 14). It will be understood that locksets may be configured with a knob, a lever, a paddle, or the like. Therefore, for the purposes of the discussion that follows, the knob portion 12 shall be deemed equally suited for cooperation with a knob, lever, paddle, rigid pull handle, dummy trim, or other lock mechanism user interface. The knob portion 12 may include an indexing feature first portion 16. The indexing feature first portion 16 is configured to cooperate with an indexing feature second portion 18 that will be discussed in further detail below. The indexing feature first and second portion, 16 and 18, may include, by way of example and not limitation, grooves, channels, stippling, splines, projections and bores, or other features known by one of ordinary skill in the art to index the knob portion 12 with respect to the jamb portion 14. The configured index position may be secured by way of a first clamping screw 20 within a groove 21. While a screw 20 is depicted as the selected fastener, it may be recognized by one of ordinary skill in the art that cammed surfaces, a removable pin, spring loaded or deadlocking retainer, or other means may be used to fix the relationship between the first indexing feature 16 and second indexing feature 18 with respect to each other.

The knob portion 12 further includes a faceplate 22 having a receiver 24 configured to slide over the spindle of a door's knob or lever. The receiver 24 is configured such that it has a width 26 large enough to accommodate the spindle of a knob, yet small enough to be trapped behind the knob of the door. Such an appropriately dimensioned receiver 24 may be said to establish a trapping relationship with respect to the door knob. The faceplate 22 is disposed in a substantially perpendicular relationship with a faceplate extension 28. Additionally, the faceplate 22 and backplate 34 are maintained in a substantially parallel relationship. It should be noted that the angle formed by the backplate 34 and backplate extension 36, as well as the faceplate 22 and faceplate extension 28, may each include acute or obtuse angles configured to accommodate varied door and hardware geometries. The faceplate extension 28 includes the indexing feature first portion 16 and may include a gusset 30 to support the perpendicular relationship of the faceplate 22 and faceplate extension 28 against distortion from loads applied thereto. Some embodiments may include a barb 32 configured to prevent the apparatus 10 from being slid up and over the knob, while the apparatus is under a load from an attempted door opening. The barb 32 becomes caught behind the underside of the knob or the lever, thus frustrating removal unless the door is fully closed.

The jamb portion includes a backplate 34 and a backplate extension 36. The backplate 34 may include a first backplate portion 37 and a second backplate portion 38. The second backplate portion 38 may further include a backlash cam 40 attached thereto. Backlash shall be understood to mean the mechanical play or slop between mating components. The relationship between the first backplate portion 36 and second backplate portion 38 may be adjusted by an indexing feature third portion 42 and indexing feature fourth portion 44, respectively. The indexing feature third and fourth portion, 42 and 44, may include, by way of example and not limitation, grooves, channels, stippling, splines, projections and bores, or other features known by one of ordinary skill in the art to index the first backplate portion 37 and second backplate portion 38. A wide variety of lock backsets, jamb depths, and door thicknesses may be accommodated by way of the indexing feature first portion 16, second portion 18, third portion 42, and fourth portion 44, as will be described in further detail below. A handle 46 is disposed at a location sufficient to provide a user with easy manipulation of the apparatus 10, while simultaneously keeping the user's fingers and hands sufficiently away from the crushing hazard of the door and jamb interface.

Figure 2:
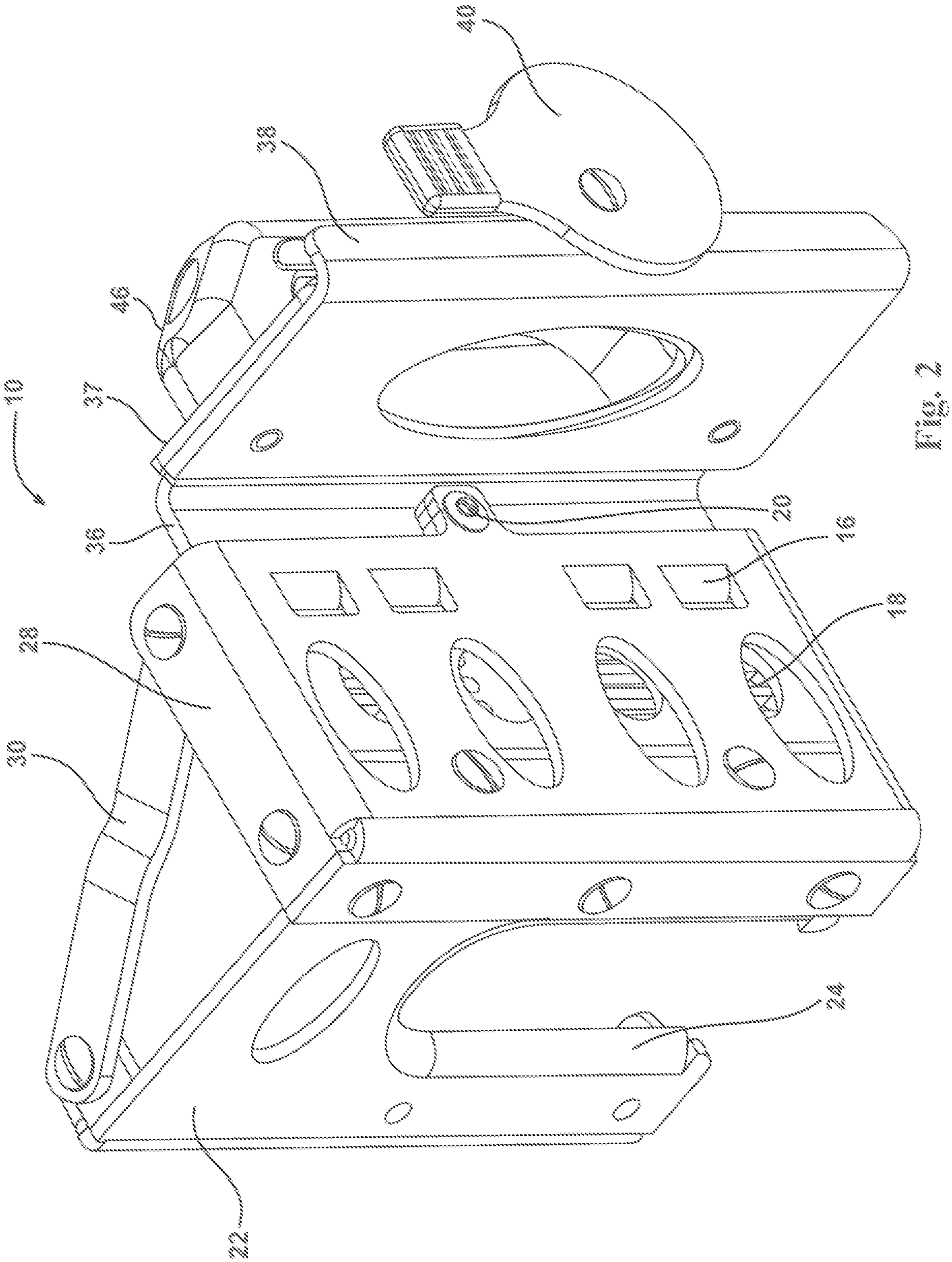
FIG. 2 is a perspective view of a second side of an embodiment of the disclosed invention.

FIG. 2 depicts the apparatus 10 from an obverse view for clarity of the elements.

Figure 3:
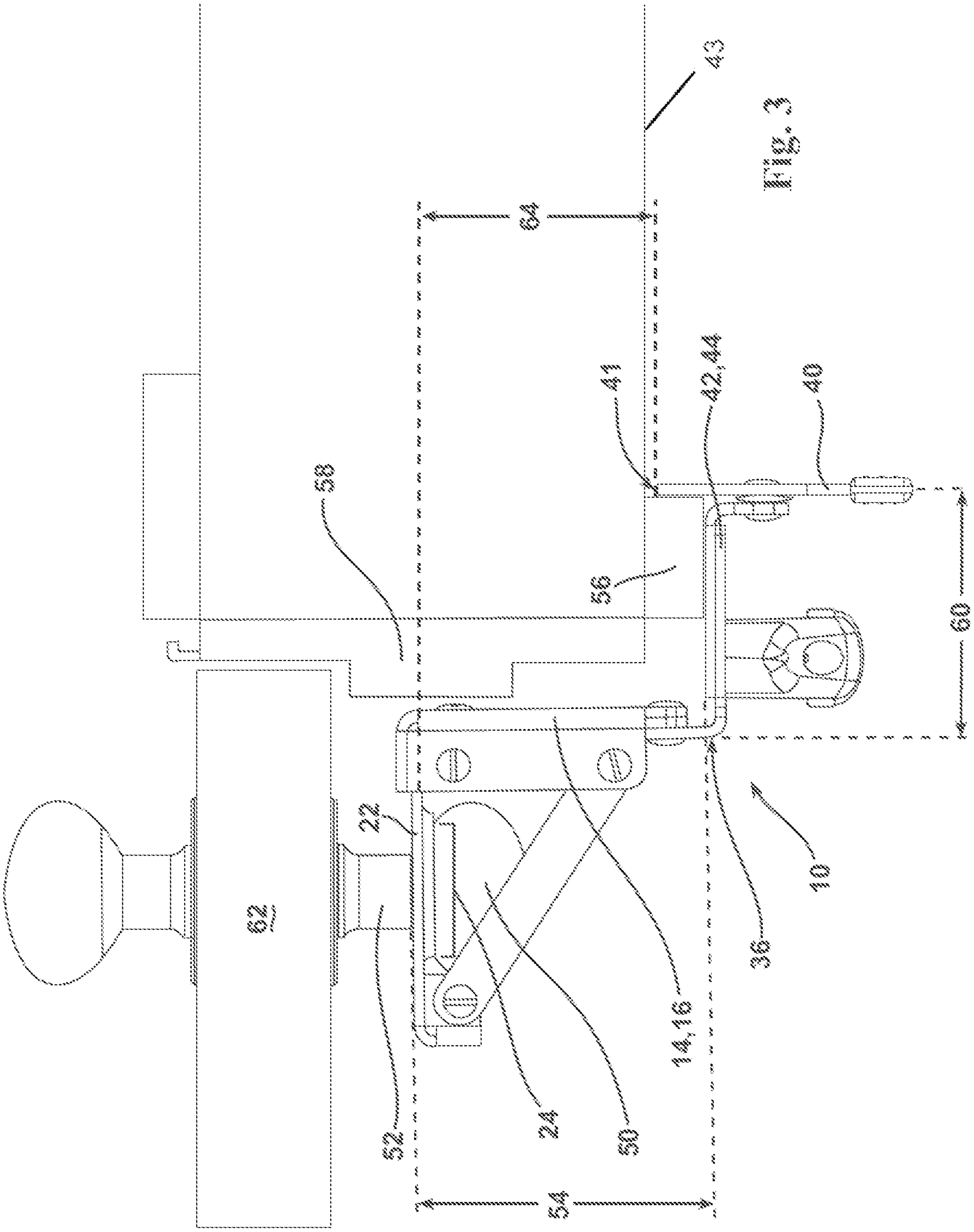
FIG. 3 is a partial cut-away top view of an embodiment of the disclosed invention in use and attached to a door.

Turning attention to FIG. 3, the apparatus 10 is shown in use. The receiver 24 of the apparatus 10 has been slid over the spindle 52 and is trapped behind the knob 50. The index feature first portion and second portion have been adjusted to establish a first distance 54. The first distance 54 has been configured to closely represent the measurement from the back side of the knob 50 and the front face of the frame 56 of the jamb 58. The adjustment of the first distance 54 is selected to be sufficient to remove much play from the apparatus 10 and mating surfaces of the frame 56, while not providing such an interference fit as to make installation and removal difficult for a user. Likewise, a second distance 60 is established by the indexing feature third and fourth portions 42 and 44, respectively. The second distance 60 is configured to place the backlash cam 40 in close conformity with the outer edge of the frame 56. By extension, the second distance is also the measurement between the backlash cam 40 and the backplate extension 36. Moreover, rotating the backlash cam 40, drives a contact surface 41 until it touches or nearly touches the wall 43. By extension, rotating the backlash cam can be said to establish a third distance 64 between the faceplate 22 and the contact surface 41. The combination of the properly adjusted first distance 54, second distance 60, and third distance 64 serves to securely trap the apparatus 10 to the knob 50 and frame 56, thus preventing the door 62 from being opened by an undesired person.

Figure 4:
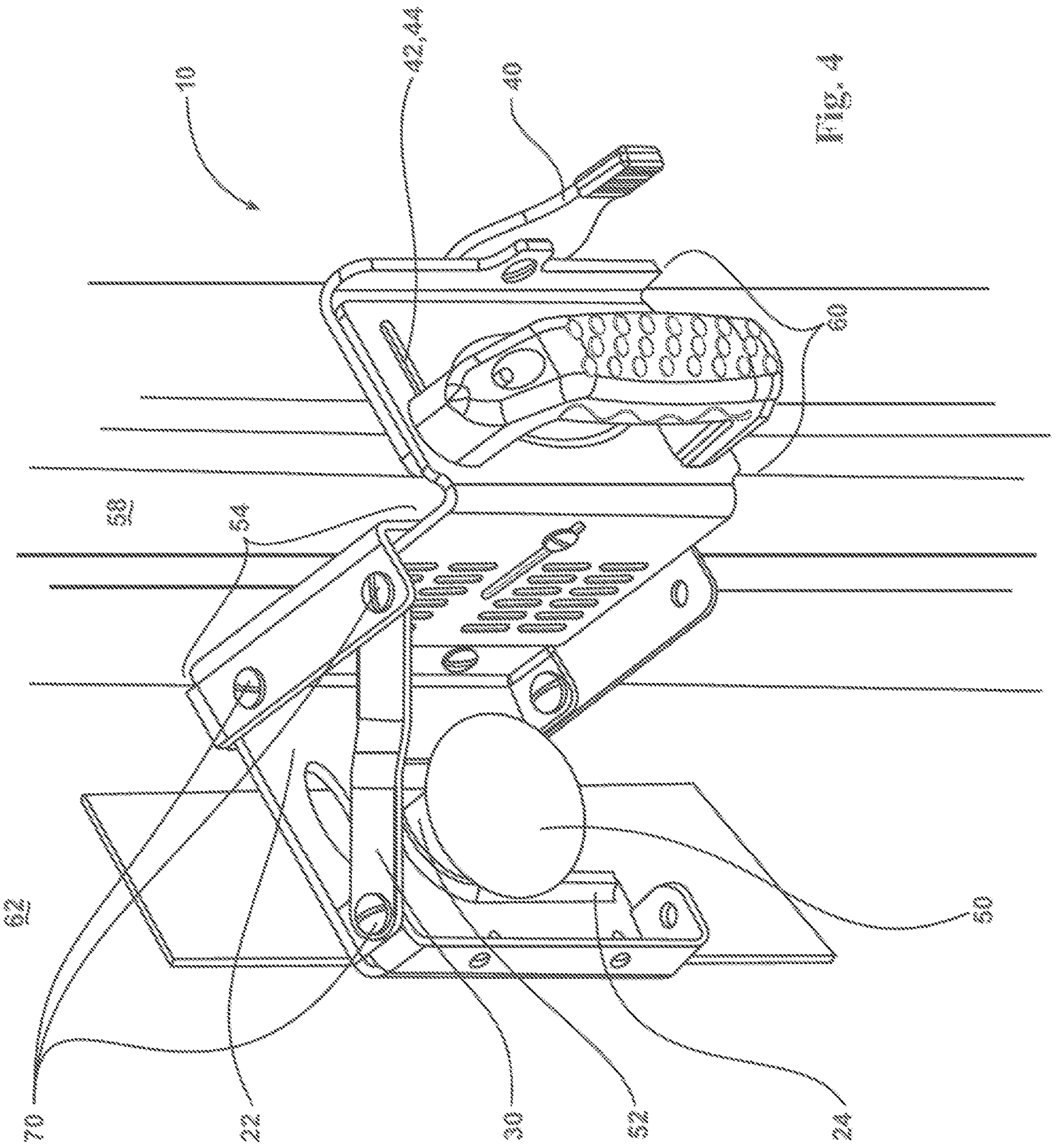
FIG. 4 is a perspective view of an embodiment of the disclosed invention in use and attached to a door.

FIG. 4 depicts a perspective view of the apparatus 10 while in use. It should be noted that the main components of the apparatus 10 are assembled with handing screws 70. The handing screws allow for user disassembly of the apparatus 10, so as to modify the apparatus 10 to function on both left and right handed doors. Once the handing screws 70 are removed, the faceplate 22 and gusset 30 may be rotated and reattached to the apparatus 10. This will change the orientation of the receiver 24 (so that the open width 26 is oriented toward the floor during deployment), and likewise allows the gusset 30 to stay clear of the knob 50 while being deployed in the now reverse handed configuration. This may be described as configuring the apparatus 10 in either a left handed or right handed mode. It will be recognized by one of ordinary skill in the art that other fasteners may serve the same function as the handing screws 70, to include by way of example and not limitation, wingnuts, quarter turn (or other sub-revolution) fasteners, pins and retainers, and the like.

Figure 5C:
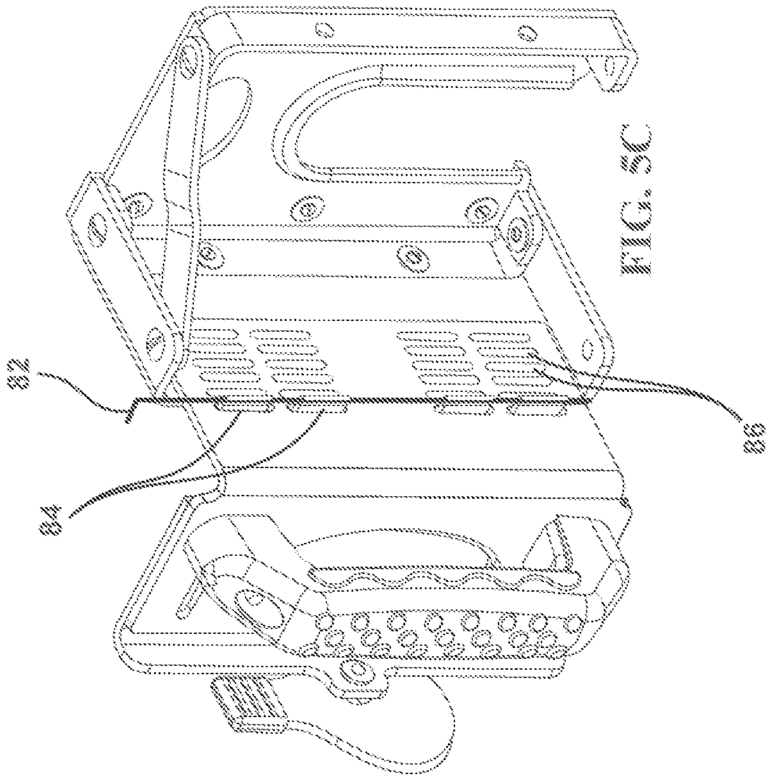
FIGS. 5A-5C depict various aspects of an embodiment of the disclose invention incorporating an emergency egress feature.
Figure 5A:
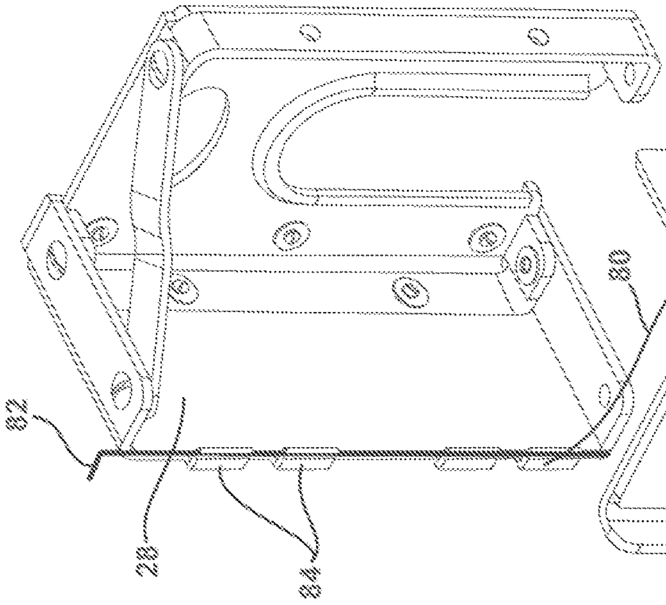
Figure 5B:
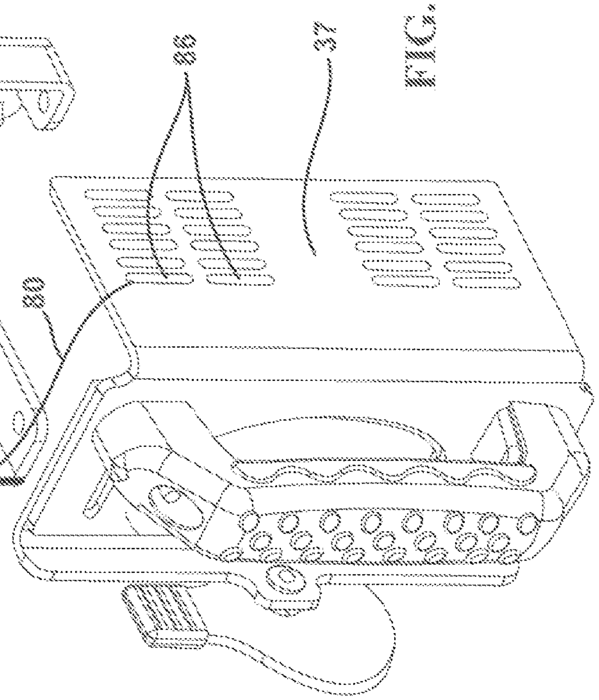

Some embodiments of the disclosed invention include an emergency egress feature 80 as shown in FIGS. 5A-4C. A retainer 82 may be selectively disposed within a plurality of protuberances 84 that are mated to the faceplate extension 28. The protuberances 84 may be placed within, and protrude from, cooperating keepers 86 that are incorporated into the backplate extension 36. Once the protuberances 84 are placed within the mating keepers 86, the retainer 82 may be laced through the protuberances, thus trapping the faceplate extension 28 with respect to the backplate extension 36. The selection of appropriate cooperating protuberances 84 and keepers 86 may yield adjustability that is analogous to the first indexing feature 16 and the second indexing feature 18. In an emergency, the removable retainer 82 may be withdrawn, thus immediately decoupling the faceplate extension 28 from the first backplate portion 37. The previously secured door 62 may then be immediately opened.

The retainer 82 may include a pin, rod, wire rope, or other suitable structure to retain the protuberances 84 with respect to the keepers 86. The removable retainer 82 may be inserted from the top or bottom of the apparatus 10, and may include auxiliary features to retain it therein (break-away seal, rubber endcaps, spring loaded or deadlocking ball detent, or the like). A plurality of rows of protuberances 84, for example a first row disposed near the faceplate 22, and a second row disposed near the backplate 34, may be employed to provide additional strength to the mating interface. In such multiple row configurations, the retainer 82 may comprise a u-shaped wire rope (aircraft cable) or heavy gauge wire having a central grasping point. As a result, a single pull by a user would serve to withdraw the retainer 82 from all protuberances 84. While the egress function has been described with respect to decoupling the faceplate extension 28 from the backplate extension 36, it will be understood by one of ordinary skill in the art that one may configure the emergency egress feature to decouple any of a plurality of elements of the apparatus 10, such that immediate opening of the door 62 is enabled.

While the present invention has been illustrated by a description of one or more embodiments thereof and while these embodiments have been described in considerable detail, they are not intended to restrict or in any way limit the scope of the appended claims to such detail. Additional advantages and modifications will readily appear to those skilled in the art. The invention in its broader aspects is therefore not limited to the specific details, representative apparatus and method, and illustrative examples shown and described. Accordingly, departures may be made from such details without departing from the scope of the general inventive concept.

What is claimed is:

1. An emergency egress apparatus in combination with a door barricade, the combination comprising:

a first portion of the door barricade comprising a faceplate and a faceplate extension that is substantially perpendicular to the faceplate, the faceplate having a receiver configured to receive a knob of a door, and the faceplate extension having a first indexing feature and a clamping screw extending therefrom; and a second portion of the door barricade comprising a backplate and a backplate extension that is substantially perpendicular to the backplate, the backplate having a backlash cam coupled thereto and configured to provide an interference fit between the backplate and a frame of the door, and the backplate extension being adjacent and in sliding relation to the faceplate extension and having a second indexing feature and a groove configured to receive the clamping screw of the faceplate extension, wherein the clamping screw of the faceplate extension is in sliding relation to the groove of the backplate extension such that the first and second indexing features are in sliding relation in order to position the backlash cam in close conformity with an outer edge of the frame of the door, and wherein the clamping screw is configured to be tightened within the groove and secure a position of the faceplate extension relative to the backplate extension.

2. The combination of claim 1, wherein the second portion further comprises:

a handle extending away from the backplate and configured to enable a user to manipulate the door barricade.

3. The combination of claim 1, wherein the first portion further comprises:

a gusset extending between the faceplate and the faceplate extension.

4. The combination of claim 1, wherein the backlash cam is configured to be rotatable such that it rotates a contact surface to be in contact with the frame of the door.

* * * * *